United States Patent
Chakra et al.

(10) Patent No.: US 9,195,367 B2
(45) Date of Patent: Nov. 24, 2015

(54) MANAGING ACTIVE GUI ELEMENTS REMOTELY

(75) Inventors: Al Chakra, Apex, NC (US); John A. Feller, Cary, NC (US); Trudy L. Hewitt, Cary, NC (US); Francesco C. Schembari, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 13/565,270

(22) Filed: Aug. 2, 2012

(65) Prior Publication Data

US 2014/0040763 A1 Feb. 6, 2014

(51) Int. Cl.
*G06F 3/0481* (2013.01)
*G06F 3/0482* (2013.01)

(52) U.S. Cl.
CPC ............ *G06F 3/0482* (2013.01); *G06F 3/0481* (2013.01)

(58) Field of Classification Search
CPC .... G06F 3/1454; G06F 3/1454; G06F 3/0481
USPC ......................................................... 715/748
See application file for complete search history.

(56) References Cited

U.S. PATENT DOCUMENTS

| | | | |
|---|---|---|---|
| 6,285,363 B1 * | 9/2001 | Mairs et al. .................... | 715/751 |
| 6,971,068 B2 | 11/2005 | Bates et al. | |
| 7,209,955 B1 | 4/2007 | Major et al. | |
| 7,490,133 B1 * | 2/2009 | Leban et al. .................. | 709/216 |
| 7,827,228 B2 | 11/2010 | Emberton et al. | |
| 8,090,361 B2 | 1/2012 | Hagan | |
| 8,146,002 B2 * | 3/2012 | Price et al. ..................... | 715/755 |
| 8,650,494 B1 * | 2/2014 | Sampath et al. ............... | 715/740 |
| 8,825,836 B1 * | 9/2014 | Gibson et al. .................. | 709/224 |
| 2003/0218636 A1 | 11/2003 | McIntyre et al. | |
| 2004/0087326 A1 * | 5/2004 | Dunko et al. .................. | 455/517 |
| 2004/0189677 A1 * | 9/2004 | Amann et al. .................. | 345/660 |
| 2006/0002315 A1 * | 1/2006 | Theurer et al. ................. | 370/261 |
| 2009/0205049 A1 * | 8/2009 | Chakra et al. .................... | 726/26 |
| 2009/0210886 A1 * | 8/2009 | Bhojwani et al. ............. | 719/318 |
| 2010/0269057 A1 | 10/2010 | Pahlavan et al. | |
| 2010/0275134 A1 * | 10/2010 | Baker et al. ..................... | 715/753 |
| 2010/0313239 A1 * | 12/2010 | Chakra et al. ..................... | 726/2 |

(Continued)

OTHER PUBLICATIONS

Brink, "How to Set Time Limit for Idle Remote Desktop Sessions", published Oct. 19, 2010, http://www.sevenforums.com/tutorials/118889-remote-desktop-set-time-limit-idle-sessions.html.*

(Continued)

*Primary Examiner* — Reza Nabi
*Assistant Examiner* — Daniel Rodriguez
(74) *Attorney, Agent, or Firm* — Paul S. Drake

(57) ABSTRACT

A method, system or computer usable program product for selectively forwarding activated graphical user interface (GUI) elements from a source system to a remote device for user interaction including configuring the source system for selectively forwarding to the remote device activated GUI elements that are for front of screen display on the source system, receiving user preferences for GUI elements to forward to the remote device, in response to a user request, identifying an activated GUI element for front of screen display on the source system and related information that meets the user preferences, and forwarding only the identified GUI element and related information to the remote device for interaction with the user.

21 Claims, 8 Drawing Sheets

(56) References Cited

U.S. PATENT DOCUMENTS

| | | | |
|---|---|---|---|
| 2011/0173681 A1* | 7/2011 | Qureshi et al. | 726/4 |
| 2011/0181492 A1* | 7/2011 | Soeda | 345/1.1 |
| 2012/0042275 A1* | 2/2012 | Neerudu et al. | 715/781 |
| 2012/0173622 A1* | 7/2012 | Toledano et al. | 709/204 |
| 2012/0185547 A1* | 7/2012 | Hugg et al. | 709/206 |
| 2012/0197793 A1* | 8/2012 | Grigg et al. | 705/41 |
| 2012/0306622 A1* | 12/2012 | Trinh et al. | 340/10.1 |
| 2013/0073449 A1* | 3/2013 | Voynow et al. | 705/39 |

OTHER PUBLICATIONS

Session Arbiter, "Setting Time Limits Using Group Policy", Mar. 15, 2012, http://sessionarbiter.codeplex.com/wikipage?title= Setting%20Time%20Limits.*

"A Secure Solution to Remotely Backing Up Data Over the Web", logmein.com, published on the world wide web at https://secure.logmein.com/products/backup/.

* cited by examiner

MANAGING ACTIVE GUI ELEMENTS REMOTELY

BACKGROUND

1. Technical Field

The present invention relates generally to remotely managing active graphical user interface elements, and in particular, to a computer implemented method for identifying and selectively forwarding active graphical user interface elements from a source system to a remote device for user interaction.

2. Description of Related Art

Graphical user interfaces (GUIs) are widely utilized by computer systems for communicating or otherwise interacting with a user visually. This allows a user with limited computer skills to interact intuitively with computer systems. There are many types of elements which may be utilized to interact visually with a user including windows, menus, icons, controls or widgets, tabs and interaction elements.

Windows are an area on a display which displays information independently from the rest of the display. Windows may be utilized for displaying information and for obtaining information or a response from a user, often for a software application being run by the user. Windows may be moved, hidden, adjusted in size, navigated using scroll bars or other elements. Multiple windows may be open at any time and overlap with each other and each window may be placed in front of or behind other windows. Various types of windows may be utilized including a container window for showing the contents of a device, a browser window allowing a user to move forward or backward through a variety of webpages, a text terminal for embedding interaction with text user interfaces, a child window such as a pop-up box which opens due to interaction with another window, and a message window or dialog box which is a type of child window typically for displaying information to and getting a response from a user. New or active windows of any kind are typically positioned in front of any other windows displayed on a computer system display. This allows the user to work on the most recently opened window without having to close or move other windows.

A message window or dialog box may be modeless or modal depending on whether they block interaction with their parent window. A modeless dialog box is typically used when any requested information is not essential to continue operation of the parent window (i.e. the program or application running the parent window). A modal dialog box will temporarily halt operation of the parent window until the requested information is provided. The requested information may simply be the user mouse clicking one of two displayed buttons or it may be detailed information for the user to provide. For example, the user may be queried whether that user agrees to certain shrink-wrap license terms before installing a program onto the computer system.

Menus allow the user to execute commands by selecting from a list of choices. Menus include a menu bar with multiple menus selections typically displayed horizontally across the top or bottom of the display. A menu bar selection may include a pull-down menu when the user clicks on that menu selection. Icons are small pictures that represent objects such as a file, program, web page or command. They allow the user to quickly execute a command, open a document, or run a program. Controls or widgets are a variety of interface elements that the computer user may interact with including a text box, a button, a hyperlink, a list box, a check box, a radio button, etc. A tab is typically a rectangular small box which contains a text label or graphical icon associated with a window. They allow a user to switch quickly between different windows or other GUI elements. Interaction elements are common idioms for user interaction such as a cursor or pointer.

In summary, there are many types of GUI elements in use today on computer systems for a variety of purposes, typically to make the user interface with the computer system more intuitive and powerful.

SUMMARY

The illustrative embodiments provide a method, system, and computer usable program product for selectively forwarding activated graphical user interface (GUI) elements from a source system to a remote device for user interaction including configuring the source system for selectively forwarding to the remote device activated GUI elements that are for front of screen display on the source system, receiving user preferences for GUI elements to forward to the remote device, in response to a user request, identifying an activated GUI element for front of screen display on the source system and related information that meets the user preferences, and forwarding only the identified GUI element and related information to the remote device for interaction with the user.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes may be taken to selectively forward activated graphical user interface (GUI) elements and related information from a source system to a remote device for user interaction in response to a user request. GUI elements may include windows, modeless or modal dialog boxes, icons or other types of GUI elements that may be displayed on a source system. An activated GUI element may be a new GUI element that is to be displayed front of screen such as a dialog box or a newly activated previously active GUI element such as a window. These activated GUI elements may be selectively forwarded by configuring the source system, receiving user preferences, and in response to a user request, identifying an activated GUI element to be displayed on the source system and related information that meets the user preferences, and forwarding only the identified GUI element and related information to the remote device for interaction with the user. The related information can include identification of an application that motivated display of the GUI element on the source system and/or a prior displayed GUI element motivated by the application. These steps may be taken as will be explained with reference to the various embodiments below.

Figure 1:
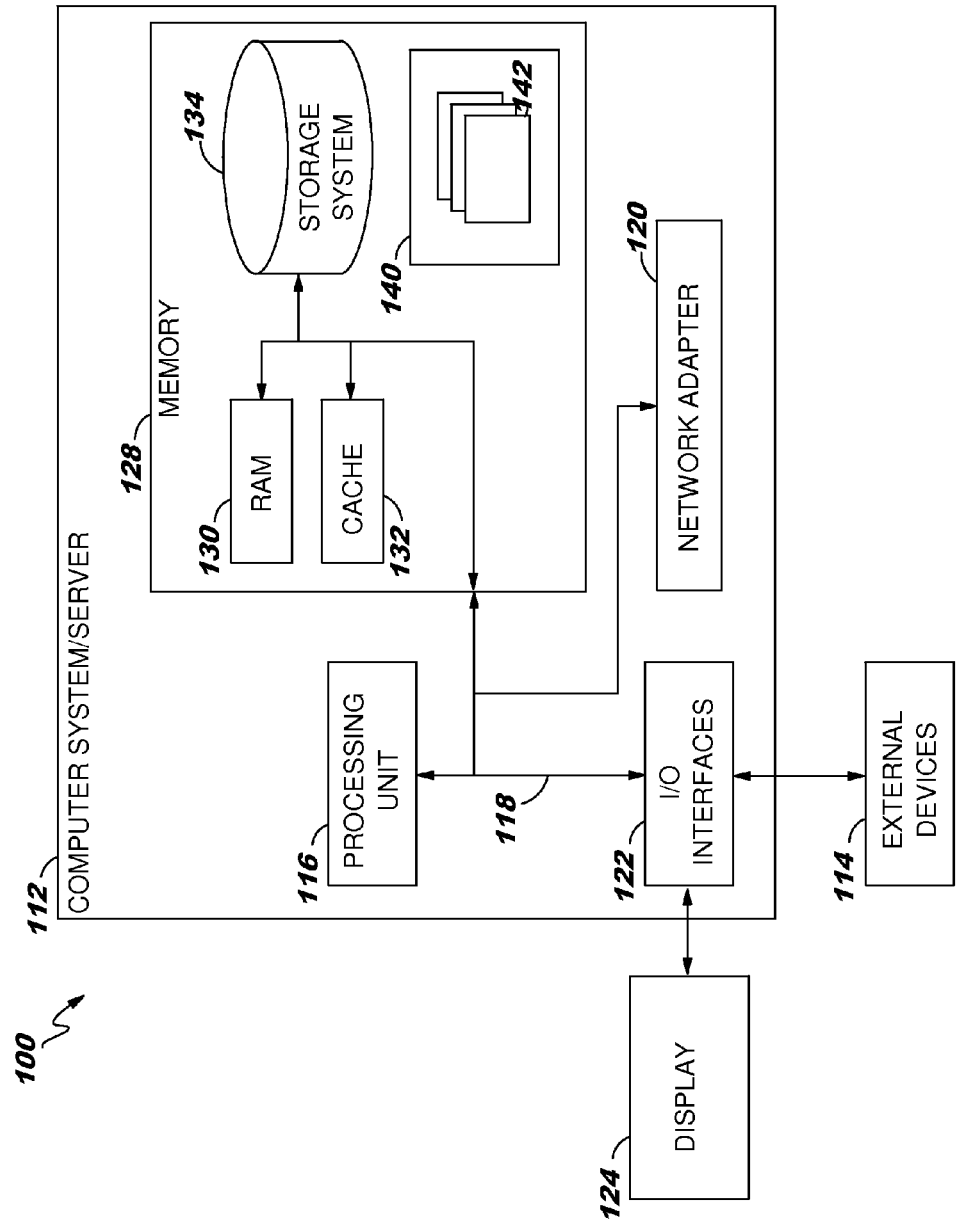
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for managing active GUI elements remotely.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
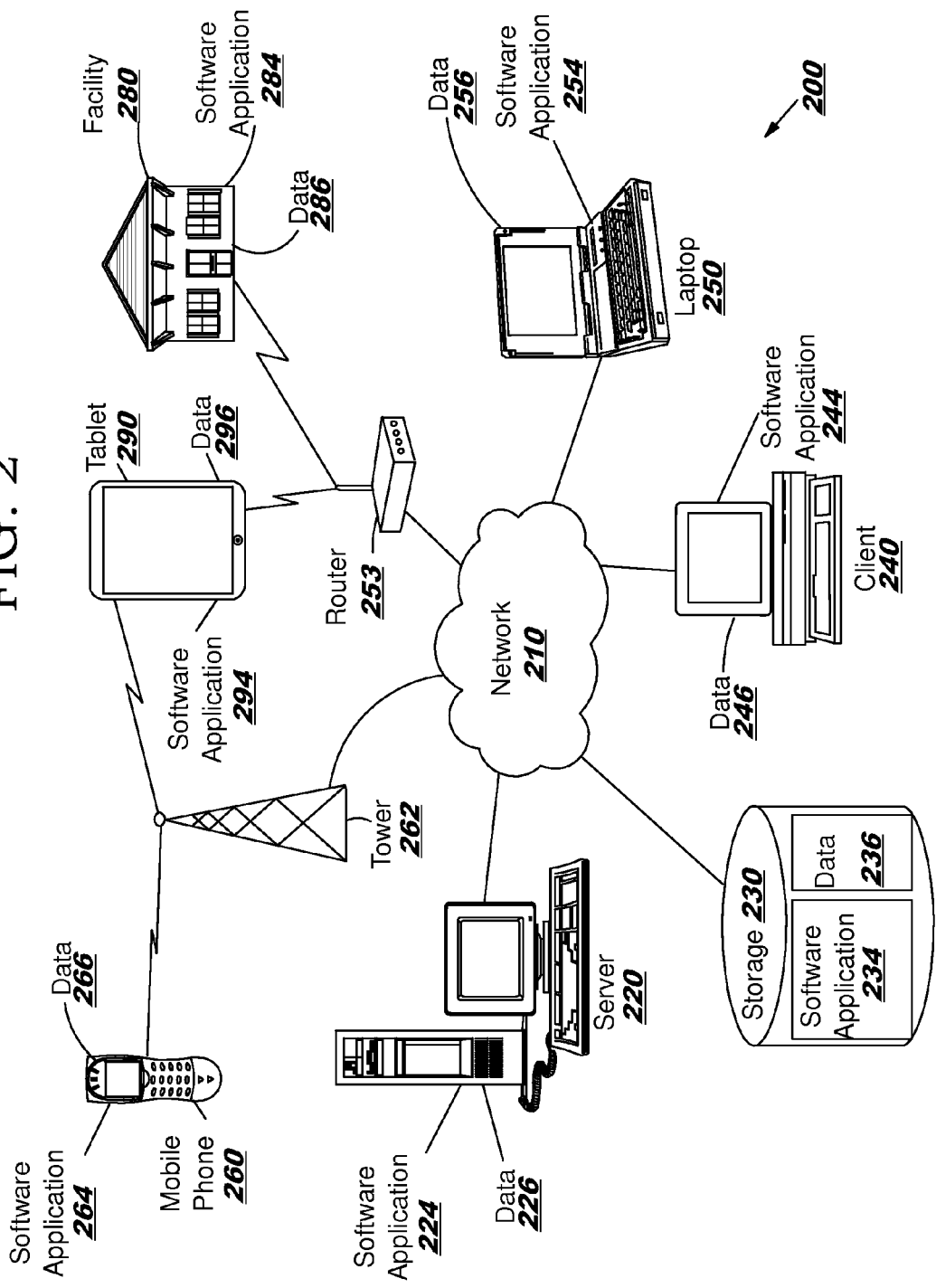
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, facility 280 (such as a home or business) and tablet 290 are coupled to network 210 including wirelessly such as through a network router 253. A mobile phone 260 (such as a smart phone) and tablet 290 may be coupled to network 210 through a mobile phone tower 262. Data processing systems, such as server 220, client 240, laptop 250, mobile phone 260, facility 280 and tablet 290 contain data and have software applications including software tools executing thereon. Other types of data processing systems such as personal digital assistants (PDAs) and netbooks may be coupled to network 210.

Server 220 may include software application 224 and data 226 for managing active GUI elements remotely or other software applications and data in accordance with embodiments described herein. Storage 230 may contain software application 234 and a content source such as data 236 for use in managing active GUI elements remotely. Other software and content may be stored on storage 230 for sharing among various computer or other data processing devices. Client 240 may include software application 244 and data 246. Laptop 250, mobile phone 260 and tablet 290 may also include software applications 254, 264 and 294 and data 256, 266 and 296. Facility 280 may include software applications 284 and data 286. Other types of data processing systems coupled to network 210 may also include software applications. Software applications could include a web browser, email, or other software application that can manage active GUI elements remotely.

Server 220, storage unit 230, client 240, laptop 250, mobile phone 260, facility 280, tablet 290 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260, facility 280 and tablet 290 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 3A:
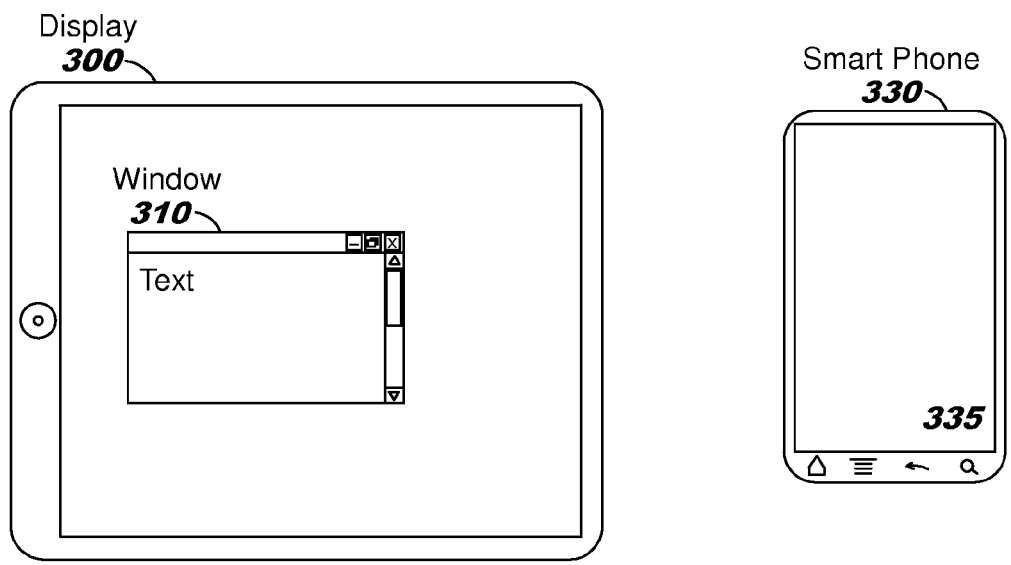
FIGS. 3A and 3B are front of screen diagrams of a source data processing system display and a remote smartphone in which various embodiments may be implemented.
Figure 3B:
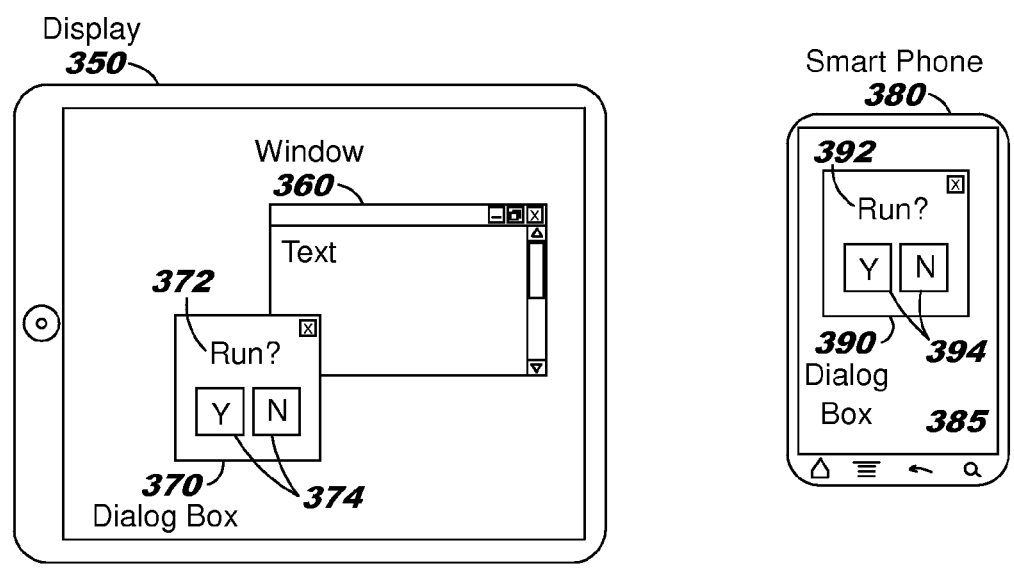

FIGS. 3A and 3B are front of screen diagrams of a source data processing system display and a remote smartphone in which various embodiments may be implemented. In this example, a user has selected that any newly activated dialog box displayed on a source data processing system display should be detected, forwarded to a remote smartphone, and then managed from the remote smartphone. An activated dialog box may be a new dialog box, possibly generated as a child window by an application to communicate or otherwise interact with the user, or a previously active dialog box that has been activated and moved to the front of screen to communicate additional information or otherwise interact with the user. This applies to many types of GUI elements that are activated or otherwise brought into focus and placed in front of other GUI elements to communicate or otherwise interact with the user. This interaction may be to notify the user of certain information or to request certain information from the user.

In FIG. 3A a display 300 coupled to a source data processing system (not shown) is shown with a window 310 displaying some text. Window 310 is generated by a program running on the data processing system in conjunction with the operating system. Remote smartphone 330 has a touch sensitive display 335. In this example, no information from display 300 is displayed on smartphone 330 because no dialog boxes are displayed on display 300.

Subsequently in FIG. 3B a display 350 coupled to a source data processing system (not shown) is shown with a window 360 and an activated dialog box 370 not shown in FIG. 3A. Dialog box 370 may be a newly activated child window to window 360 and may have been generated to obtain certain information from the user. Dialog box may also be a prior window previously hidden by window 360 which has been moved in front of window 360 in order to interact with the user. Dialog box 370 includes a text query 372 and buttons 374 for the user to answer the query. Remote smartphone 380 has a touch sensitive display 385 which is displaying a dialog box 390. Dialog box 390 contains comparable text query 392 and buttons 394 as shown in dialog box 370. They are comparable in that the same information is provided and response is sought, but certain details such as fonts may differ due to differences between the data processing system and the smartphone. If dialog box 370 could be natively handled by the operating system of smartphone 380, then it may be easily forwarded to smartphone 380 for display. If dialog box 370 cannot be natively handled by the operating system of smartphone 380, then the dialog box will need to be examined or otherwise parsed for the text and format and then converted or otherwise transformed into a format which can be handled by the operating system of smartphone 380. This may vary based on the type of operating systems in the data processing system, the remote system, and the type and mode of the dialog box.

Dialog box 390 has been forwarded from the data processing system to the smartphone for remote management. The user may then select one of the buttons on the smartphone to reply to the query from the data processing system. Whereas the data processing system may typically require the user at display 300 to provide a mouse click or keyboard input to answer the query, the user may respond to the same query on the smartphone by pressing a location on the touch sensitive display. By making a selection at the smartphone, the response will be forwarded by the smartphone to the data processing system. The data processing system can then accept the user response from the smartphone as if the user responded at display 350. As a result, the user was able to manage the dialog box remotely. This may be particularly useful if the user was taking a break but wanted to respond to any queries from the data processing system.

Although this example illustrates the user managing a dialog box remotely, the user may also remotely manage other types of active GUI elements selected by the user such as windows, menus, icons, etc. This would allow the user to manage a variety of ongoing tasks. For example, a user could remotely manage the ongoing installation of a program onto a data processing system without having to remain at the data processing system. In addition, the user could remotely view and manage the results of a program that may be provided in a newly activated child window. Furthermore, if a program is being loaded onto a data processing system resulting in an icon being added to the system desktop, then that icon could be forwarded to the remote device to allow the user to initiate and run that just loaded program.

Figure 4:
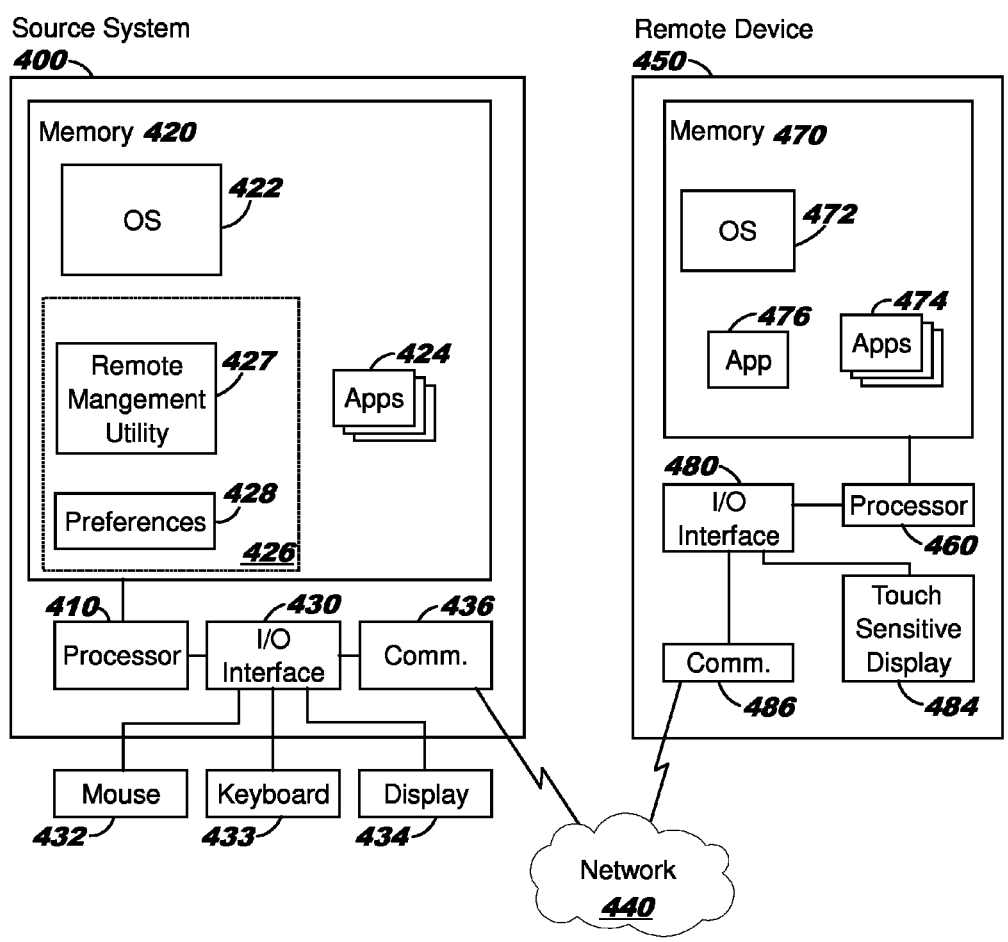
FIG. 4 is a block diagram of a remote system managing active GUI elements from a source system in which various embodiments may be implemented.

FIG. 4 is a block diagram of a remote system managing active GUI elements from a source system in which various embodiments may be implemented. Source system 400 may be a desktop computer, a laptop, a server, a tablet, a smartphone, or other type of data processing system which may generate various GUI elements for interacting with a user. Remote device 450 may be a smartphone, a tablet, a server, a laptop, a desktop system, or other type of data processing system which may manage active GUI elements on source system 400 across network 440.

Source system 400 includes a processor 410 or other type of processing unit coupled to memory 420 and input/output (I/O) interface 430. Memory 420 includes an operating system (OS) 422, software applications 424, and a remote management application 426 for implementing remote management of GUI elements. Application 426 includes a remote management utility 427 and preferences 428. I/O interface 430 is coupled with mouse 432, keyboard 433, display 434 and communications interface 436. Communications interface 436 may be wired or wireless, Ethernet, WiFi, cellular, etc. for communicating with other devices across network 440. Network 440 may be a local area network, a wide area network, a cellular network, the internet, or other type of network.

Remote device 450 includes a processor 460 or other type of processing unit coupled to memory 470 and input/output (I/O) interface 480. Memory 470 includes an operating system (OS) 472, software applications 474, and an application 476 for implementing remote management of GUI elements. I/O interface 480 is coupled with touch sensitive display 484 and communications interface 486. Communications interface 486 may be wired or wireless, Ethernet, WiFi, cellular, etc. for communicating with other devices across network 440.

In both the source and remote systems an operating system provides a GUI including GUI elements for a user on behalf of an application. In some operating systems, there is a windows manger, a GUI shell, or other elements which perform the necessary tasks and management of the GUI. As a result, each type of operating system varies in how this is accomplished. Regardless, these elements are treated as an operating system herein as one of ordinary skill in the art can easily modify an implementation of these various embodiments to many types of operating system environments.

In this embodiment, a remote management utility 417 obtains the user preferences for storage in preferences 428, configures the system accordingly, establishes a connection with the remote system 450, and then manages the monitoring, detection, filtration, transformation and forwarding of selected GUI elements across network 440 to remote system 450 for display and processing for user interaction including awaiting a user response and receiving that user response for processing as if the user responded to the GUI element on the source system. Application 476 manages the display and management of the GUI elements by OS 472 in remote system 450. In an alternative embodiment, source system may transform a GUI element to a standard form which is then further transformed by the remote device to a form suitable for display on the remote device. Alternative embodiments may utilize alternative configurations such as multiple remote devices.

Figure 5:
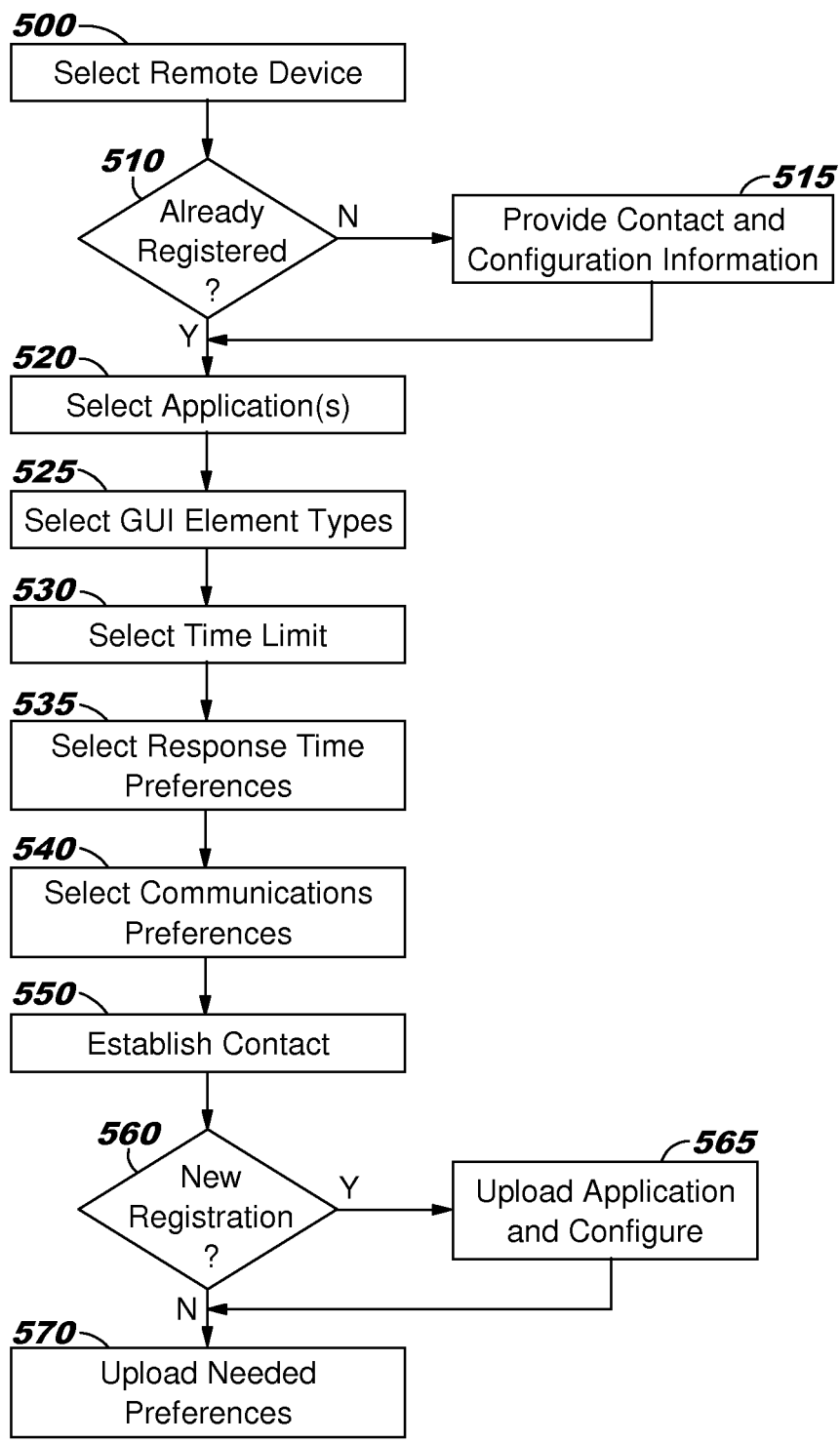
FIG. 5 is a flow diagram of a push approach for setting up remote management of active GUI elements in accordance with a first embodiment.

FIG. 5 is a flow diagram of a push approach for setting up remote management of active GUI elements in accordance with a first embodiment. In this approach, the user pushes management of certain GUI elements from a source data processing system (i.e. source system) to a remote data processing system (i.e. remote device) using a remote management utility. This may be accomplished by interacting with the user by using a window such as described below with reference to FIG. 7.

In a first step 500, the user opens a window for pushing management of certain GUI elements to a remote device and selects that remote device. If that device was previously registered with the remote management utility, then it may be selected from a list or pull down menu. Otherwise, the user will start a registration process. Multiple remote devices may be selected. In step 510, it is determined from the user's selection whether the device is already registered. If yes, then processing continues to step 520. Otherwise, in step 515 the user provides contact information of the remote device such as an internet protocol (IP) address or a mobile phone number. Depending on the type of device and contact information, the user may also need to provide certain configuration information regarding the remote system. For example, if it is a smartphone, then the user may need to provide the type of operating system used by that device and/or the carrier used by that device. Processing then continues to step 520.

In step 520, the user starts the selection of a variety of options referred to herein as user preferences. There may be a set of default selections that the user may then modify or not. In this step, the user selects whether the GUI elements to be forwarded originate from any software application on the source system or just from selected application(s). This allows the user to limit which applications may be managed remotely through their GUI elements. Subsequently in step 525 the user selects whether all activated GUI elements from the selected program or just certain activated GUI element(s) are forwarded to the remote device. For example, the user may select only modal dialog boxes from a certain application be forwarded. Modal dialog boxes require a response before the program can continue. Other types of selections may be message windows, modeless dialog boxes, status windows, icons, only windows requiring a user response, etc.

Then in step 530 the user selects whether a time limit should be placed on the remote management of the selected GUI elements. For example, if the user plans to be away from the source system for lunch, the user can select one hour and then not have to suspend or exit the remote management control upon return. This also maintains a certain level of security if the user is leaving for the evening, but does not want remote management available overnight. Subsequently in step 535 the user may also select certain response time limits. This limitation would require the user to respond to any GUI element requesting information within a certain time limit. This may be used as another form of security.

Subsequently in step 540 the user may set certain communication preferences. For example, the user may select that the GUI element be forwarded as a comparable GUI element on a remote device display. However, the user may select that the content of the GUI element be sent to the remote device as an email, a text message, a voice message, instant message, etc. with similar response types available. For example, a dialog box query with a yes or no answer may be sent as a text and may be answered with a return text or Yes or No.

Other types of preferences may be selected by the user in alternative embodiments. Also, a set of default preferences may be provided or selected by the user to minimize the amount of interaction needed for each remote management session. After the selection of preferences has completed and stored in memory, then in step 550, the source system establishes communications with the remote device. This may be across a variety of networks including the internet or cellular networks. The type of network may be established in step 515 above. As communications are established, any security protocols may be performed such as token exchanges, password submission, email exchange, user confirmation, etc. to ensure that the communication is with the appropriate remote device.

In step 560, it is determined whether this is a new registration of a remote device. That is, it is determined whether the remote device was just registered in step 515 above. If not, then processing continues to step 570. If not, then processing continues to step 565 where an application can be uploaded to the remote device from the source device to manage the communications and system configuration. In an alternative embodiment, the application can be downloaded from a central repository on the internet or other location based on a request from the source system or the user. Processing then continues to step 570. In step 570, the necessary preferences may be uploaded to the remote device application. For example, the user may select sending and receiving text messages and the remote device application can help manage that process from the remote device.

Figure 6:
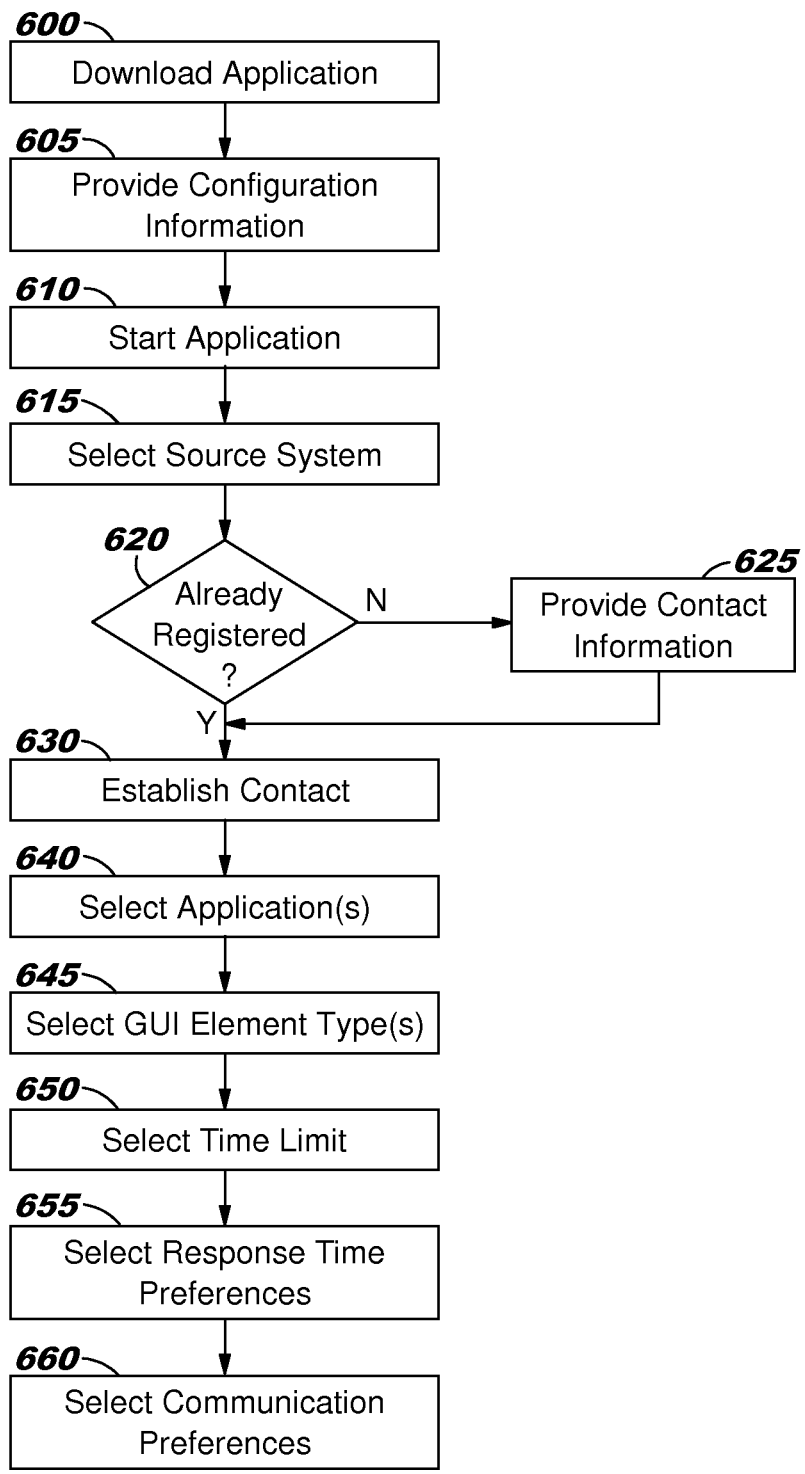
FIG. 6 is a flow diagram of a pull approach for setting up remote management of active GUI elements in accordance with a second embodiment.

FIG. 6 is a flow diagram of a pull approach for setting up remote management of active GUI elements in accordance with a second embodiment. In this approach, the user pulls management of certain GUI elements from a source data processing system (i.e. source system) to a remote data processing system (i.e. remote device) using a remote management utility. This may be accomplished by interacting with the user by using a window similar to that described below with reference to FIG. 7. Once pulled, the system may act as a push system of GUI elements from the source system to the remote device that initiated the management session.

In a first step 600, the user downloads a remote management application for pulling the remote management of a source system if the user has not already done so. The application may be downloaded from a server across the internet or even from the source system. Once downloaded, certain configuration information may need to be provided in step 605 such as the type of remote device, the type of operating system used by the remote device and/or the carrier used by that device. If the application was already downloaded and configured, then steps 600 and 605 may be skipped.

In step 610, the user runs the remote management application thereby opening a window on the remote device. In step 615, the user then selects a source system for managing certain GUI elements. If the remote device was previously registered with the source system, then it may be selected from a list or pull down menu. Otherwise, the user will start a registration process. In step 620, it is determined from the user's selection whether the remote device is already registered with the source system. If yes, then processing continues to step 630. Otherwise, in step 625 the user provides contact information of the source system such as an internet protocol (IP) address or a mobile phone number. Processing then continues to step 630.

In step 630, the remote device establishes communications with the source system. This may be across a variety of networks including the internet or cellular networks. As communications are established, any security protocols may be performed such as token exchanges, password submission, email exchange, user confirmation, etc. to ensure that the communication is with the appropriate source system.

The user starts the selection of a variety of options with the source system application referred to herein as user preferences. There may be a set of default selections that the user may then modify or not. The remote device application assists in this communication with the source system and retains any needed preference information during the following steps. In step 640, the user selects whether the GUI elements to be forwarded originate from any software application on the source system or just from selected application(s). This allows the user to limit which applications may be managed remotely. Subsequently in step 645 the user selects whether all activated GUI elements from the selected program or just certain GUI element(s) are forwarded to the remote device. For example, the user may select dialog boxes of any type from any application be forwarded. Other types of selections may be message windows, modeless dialog boxes, status windows, icons, only windows requiring a user response, etc.

Then in step 650 the user selects whether a time limit should be placed on the remote management of the selected GUI elements. For example, if the user plans to be away from the source system for lunch, the user can select one hour and then not have to suspend or exit the remote management control upon return. This also maintains a certain level of security if the user is leaving for the evening, but does not want remote management available overnight. Subsequently in step 655 the user may also select certain response time limits. This limitation would require the user to respond to any GUI element requesting information within a certain time limit. This may be used as another form of security.

Subsequently in step 660 the user may set certain communication preferences for the management of the GUI elements. For example, the user may select that the GUI element be forwarded as a comparable GUI element on a remote device display. However, the user may select that the content of the GUI element be sent to the remote device as an email, a text message (MMS or SMS), a voice message, instant message, etc. with similar response types available. For example, a message box query with a short answer field (e.g. user's name) may be sent as a text and may be answered with a return text short answer.

Other types of preferences may be selected by the user in alternative embodiments. Also, a set of default preferences may be provided or selected by the user to minimize the amount of interaction needed for each remote management session.

Figure 7:
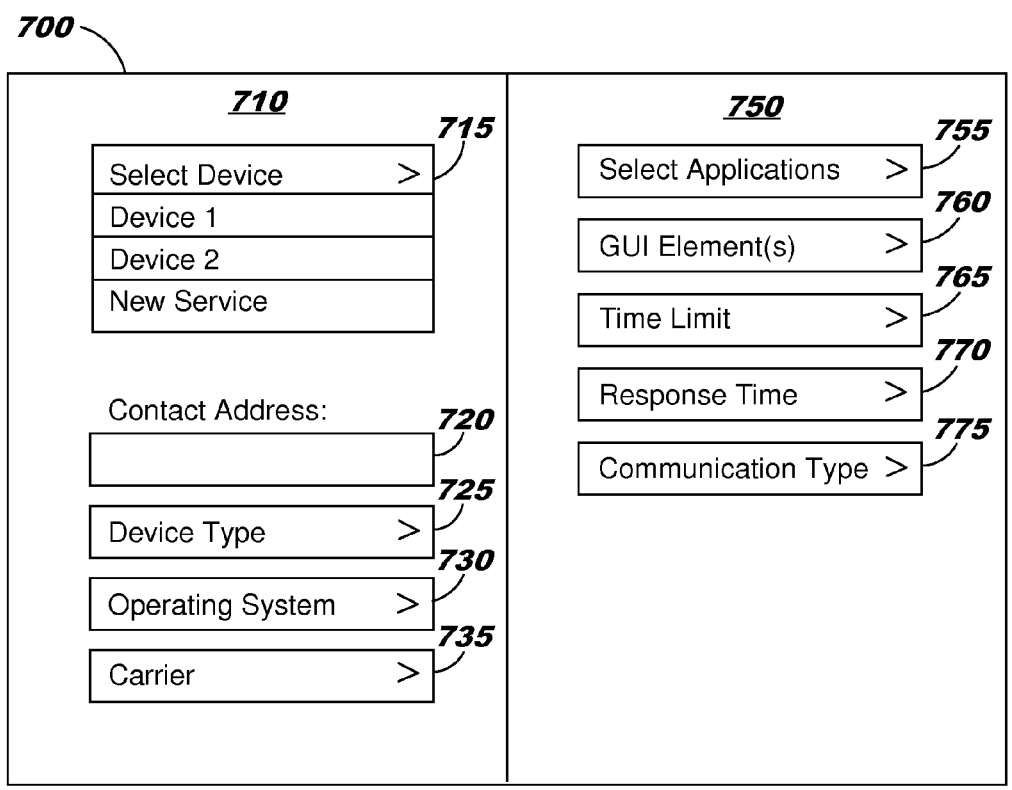
FIG. 7 is an illustration of a window for a user to select the desired option in which various embodiments may be implemented.

FIG. 7 is an illustration of a window for a user to select the desired options for remote management in which various embodiments may be implemented. Although this window illustrates the options for a push approach as described above with reference to FIG. 5, a similar window or other type of user interface may be utilized for a pull approach as described above with reference to FIG. 6.

Window 700 includes two sections. Section 710 includes options and selections that are specific for identifying and configuring a remote device. Section 720 includes options and selections that are for determining which GUI elements are forwarded to the remote device and the conditions that apply.

Section 710 includes a pull down menu 715 for selecting a remote device. That pull down menu is shown with its options in this example. Those options include device 1, device 2 or a new device. Device 1 and device 2 were previously registered with the source system application in this example. If either of those registered devices is selected, the relevant information for that device shown below and may be modified. If a new device is selected, then additional information may be provided. First, a contact address such as an IP address needs to be provided in input field 720. The device type is selected from a pull-down menu 725 (e.g. mobile phone, laptop, etc.). The operating system for the remote device is selected from a list of options in a pull down menu 730. These options may be provided based on the device type selected. Finally, if a mobile phone were selected above, then a carrier 735 for that remote device may be selected.

Section 750 includes a pull down menu 755 for selecting which applications on the source system may need to be remotely managed. This can include the option of all applications. A pull down menu 760 is used for selecting which types of GUI elements should be forwarded to the remote system. This can include the option of all GUI elements. Pull down menu 765 allows the user to select from a variety of options for a time limit for remote management. This can be set to some standard options such as 15 minutes, 30 minutes, 1 hour, 2 hours, 6 hours, 12 hours, or until session terminated by user. Pull down menu 770 is a pull down menu providing options for response time such as 5 minutes, 10 minutes, etc. Alternatively pull down menus 765 and 770 this could be a user entry field where the user types the number of minutes or hours for the time limit or response time. Pull down menu 775 is a set of options for communications types, which may be dependent on the device type. This could be comparable GUI elements, email, MMS texts, SMS texts, etc.

Alternative embodiments may utilize additional or different selections, different options, alternative methods of selecting those selections and options, and alternative ways of organizing those selections and options. For example, the user may select a rule for the number of notifications from the same application.

Figure 8:
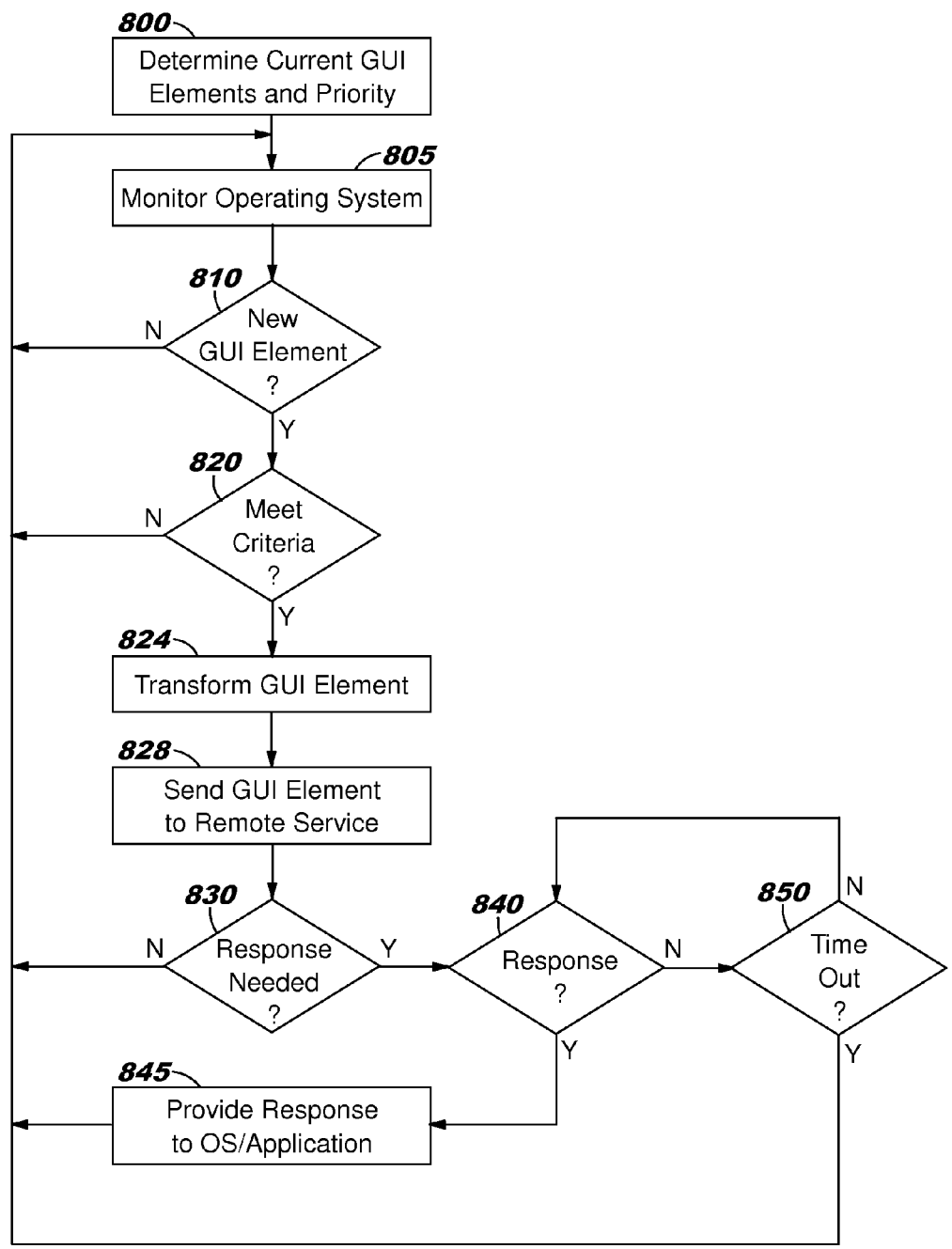
FIG. 8 flow diagram of a source system providing management of selected active GUI elements to a remote device in which various embodiments may be implemented.

FIG. 8 is a flow diagram of a source system providing management of selected active GUI elements to a remote device in which various embodiments may be implemented. Only a GUI element that has been activated and related information to that GUI element may be forwarded in this process. That is, other GUI elements displayed on the source system will not be forwarded unless they are subsequently activated. Related information may include identification information of the application related to the GUI element. Although only activated GUI elements are forwarded, the current active window on a source system may be forwarded when the remote management application is first invoked, particularly if a pull process is utilized to invoke the remote management application. This remote management process may be summarized as monitor, detect, filter, transform, forward, await response, and receive that user response for processing as if the user responded to the GUI element on the source system. The steps of monitor, detect and filter may be referred to collectively as identify. The steps of transform and forward may be collectively referred to as forward. This embodiment of the remote management process does not require any modifications to the applications being monitored or the operating systems. Alternative embodiments may utilize other paradigms and approaches for remotely managing GUI elements remotely including building this capability into the operating system or other commonly utilized utilities.

In a first step 800, the remote management application determines the current GUI elements displayed on the source system and their relative priority. That is, the various GUI elements are prioritized from front of screen to back of screen. This allows the remote management application to prepare any configurations that may be needed for each GUI element ahead of time and may be useful in identifying related information to an activated GUI element. Operating systems typically provide this type of information based on various types of instructions or calls. For example, in many windows environments, one may press control alt delete to invoke a task manager that provides similar information. In alternative embodiments, only the current most front of screen GUI element is identified.

In step 805, the remote management application monitors the operations of the operating system such as by monitoring any API calls from applications to determine whether a GUI element has been activated thereby moving that GUI element to front of screen. This may be performed by periodic calls to the operating system similar to step 800 above or by taking advantage of certain monitoring utilities and application program interfaces available with many operating systems. When a GUI element is activated and becomes the most front of screen element, it is either a new GUI element such as a message window that has just been activated or it may be a previously activated GUI element that has become the most recently active GUI element due to some action by the underlying application or operating system. In either case, the activated GUI element may require user notification and/or response. In each case, the remote management application can detect the activation of a GUI element by monitoring the operating system and its activities related to the various applications. This can include utilizing an operating system monitoring program to monitor the APIs of the applications selected by the user. In step 810, it is determined whether a GUI element has been activated, thereby moving it to front of screen. If yes, that GUI element may be a newly activated GUI element or a previously activated GUI element that has changed priority to become the most front of screen GUI element. If the most front of screen GUI element has not changed and no GUI element has been activated, then processing returns to step 805.

If a GUI element has been activated, then in step 820 it is filtered by determining whether than GUI element meets the selection criteria set forth by the user. That is, it is determined whether the activated most front of screen GUI element is from an application and is a type of GUI element as selected by the user. For example, by reviewing the types of activity by the operating system, the source of that activity, and the type of GUI element being activated, the remote management application can determine which application motivated (i.e. caused) the GUI element to be activated, the type and mode of GUI element (e.g. modal dialog box), whether it requires any user feedback, etc. The exact methods of accomplishing this may vary by operating system but are well documented for any widely used operating systems. Other criteria may be selected by the user in alternative embodiments. If it does not meet the selection criteria, then processing returns to step 805, otherwise processing continues to step 824.

In step 824, the activated GUI element is then transformed to be forwarded to the remote device. Only the activated GUI element and related information that meets the user preferences is transformed and forwarded to the remote device. This avoids sending to the user any information not needed to manage the forwarded GUI element. Related information can include identification of the application that motivated the display of the activated GUI element about to be sent to the user at the remote device. Related information can also include information captured from previously displayed information from other GUI elements that were from the same application. For example, if there is a query, the application may need to be identified for the user to understand which application is making the query. In addition, there may be a prior informational message from the same application currently displayed on the source system (not front of screen) which can be identified from step 800 above. If so, then that information may also be provided to the user to provide context for the current query. This transformation should not require any modifications to the application programs. The type of transformation depends on the capabilities of the remote device and the user selections. That is, if a remote device can handle the GUI element natively and that is what the user selected, then little transformation is needed. However, if the remote device cannot handle the GUI element natively or if the user selected otherwise (e.g. the user selected an SMS text), then the GUI element may be significantly transformed. For example, the text of the GUI element may be parsed for text and the fields identified for input to determine whether there is a query with a list of responses (e.g. "Do you want to continue?", "Yes" and "No"). Subsequently in step 828 the transformed GUI element is forwarded to the remote device as previously requested by the user. This may be natively, as allowed by the remote device and selected by the user, or in other forms as needed or selected. In the example described above, the query can then be forwarded to the user on the remote device in an acceptable form and then the list of responses can also be provided with instructions on how to provide a response. For example, the query "Do you want to continue?" could be sent as a voice message with some information identifying the source application and with instructions to "Press 1 for Yes" and "Press 2 for No". The GUI element may still be displayed at the source system concurrently.

Subsequently in step 830 it is determined whether a response from the user is needed. If not, then processing returns to step 805 above. If yes, then in step 840 it is determined whether the user has responded yet at the remote device. If yes in step 840, then in step 845 that response is provided to the operating system and application for handling as if the user had responded at the GUI element on the source system and processing returns to step 805. If not in step 840, then in step 850 it is determined whether the time for responding has timed out yet based on a prior user response selection. If not in step 850, then processing returns to step 840, otherwise processing returns to step 805.

Although the above was described above with reference to a single remote device, the same processes may be utilized for multiple remote devices, thereby allowing a user or multiple users to manage GUI elements remotely from multiple locations. The above also described processes for handled a single GUI element at a time. Alternative embodiments may handle multiple GUI elements concurrently depending on remote device capability and user preferences. For example, the operating system may be monitored while a prior activated GUI element is provided remotely and awaits a user response. If the remote device cannot handle multiple GUI elements concurrently, then the GUI elements to be handled may be queued for serial handling by the remote device. Alternative embodiments may also look for changes in priority between GUI elements other than the most front of screen GUI element to determine which GUI elements should be forwarded to a remote device for remote management.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing activated GUI elements remotely. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of selectively forwarding activated graphical user interface (GUI) elements from a source system to a remote device for user interaction comprising:
   configuring the source system for forwarding to the remote device a subset of activated GUI elements that are for front of screen display on the source system based on user preferences;
   receiving the user preferences from the user for determining which GUI elements to forward to the remote device;
   in response to a user request from the user, identifying an activated GUI element for front of screen display on the source system and related information that meets the user preferences; and
   subsequent to the user request, forwarding only the identified GUI element and related information that meet the user preferences to the remote device for interaction with the user when the user is remote from the source system wherein interaction with the user includes receiving a user response through the forwarded GUI element at the remote device for processing by the source system;
   wherein forwarding the identified GUI element includes transforming the identified GUI element from at least a first one from a set of window, dialog box and icon to a voice message.

2. The method of claim 1 wherein the activated GUI element includes at least one from the set of a new GUI element and a newly activated previously active GUI element but does not include GUI elements displayed on the source system that were not activated subsequent to the user request other than the most front of screen current active window.

3. The method of claim 1 wherein the related information includes at least one of the set of an identification of an application that motivated display of the GUI element on the source system and a prior displayed GUI element motivated by the application.

4. The method of claim 1 wherein the user preferences include at least one from the set of GUI element type, GUI element mode, and GUI element application.

5. The method of claim 1 wherein the user preferences includes a time limit for the source system to identify and forward the activated GUI element.

6. The method of claim 1 further comprising awaiting a response from the user through the forwarded GUI element meeting the user preferences at the remote device, receiving the response from the user from the remote device, and utilizing the response as if it was from the activated GUI element on the source system.

7. The method of claim 1 wherein identifying an activated GUI element on the source system includes monitoring an operating system on the source system, detecting any GUI element activated by the operating system, and determining whether the activated GUI element meets user preferences.

8. The method of claim 1 wherein forwarding the identified GUI element includes transforming the identified GUI element from a first format not suitable for processing by the remote system to a second format suitable for processing by the remote system for interaction with the user on the remote system.

9. The method of claim 1 further comprising installing a program onto the source system; wherein configuring the source system includes configuring the source system for forwarding to the remote device a subset of activated GUI elements regarding the installation of the program forwarding the identified GUI element includes transforming the identified GUI element from at least a first one from a set of window, email, text, instant message and voice message to at least a different one from the set of window, email, text, instant message, and voice message.

10. The method of claim 1 further comprising:
awaiting a response from the user through the forwarded GUI element at the remote device;
receiving the response from the user from the remote device; and
utilizing the response as if it was from the activated GUI element on the source system;
wherein the activated GUI element includes at least one from the set of a new GUI element and a newly activated previously active GUI element;
wherein the related information includes at least one of the set of an identification of an application that motivated display of the GUI element on the source system and a prior displayed GUI element motivated by the application;
wherein the user preferences include at least one from the set of GUI element type, GUI element mode, and GUI element application;
wherein identifying an activated GUI element on the source system includes monitoring an operating system on the source system, detecting any GUI element activated by the operating system, and determining whether the activated GUI element meets user preferences; and
wherein forwarding the identified GUI element includes transforming the identified GUI element from a first format not suitable for processing by the remote system to a second format suitable for processing by the remote system for interaction with the user on the remote system.

11. The method of claim 1 wherein the identified GUI element is a dialog box.

12. A data processing system for selectively forwarding activated graphical user interface (GUI) elements from a source system to a remote device for user interaction, the data processing system comprising:
a processor; and
a memory storing program instructions which when executed by the processor execute the steps of:
configuring the source system for forwarding to the remote device a subset of activated GUI elements that are for front of screen display on the source system based on user preferences;
receiving the user preferences from the user for determining which GUI elements to forward to the remote device;
in response to a user request from the user, identifying an activated GUI element for front of screen display on the source system and related information that meets the user preferences; and subsequent to the user request, forwarding only the identified GUI element and related information that meet the user preferences to the remote device for interaction with the user when the user is remote from the source system wherein interaction with the user includes receiving a user response through the forwarded GUI element at the remote device for processing by the source system;
wherein forwarding the identified GUI element includes transforming the identified GUI element from at least a first one from a set of window, dialog box and icon to a voice message.

13. The data processing system of claim 12 wherein the activated GUI element includes at least one from the set of a new GUI element and a newly activated previously active GUI element but does not include GUI elements displayed on the source system that were not activated subsequent to the user request other than the most front of screen current active window.

14. The data processing system of claim 12 further comprising awaiting a response from the user through the forwarded GUI element meeting the user preferences at the remote device, receiving the response from the user from the remote device, and utilizing the response as if it was from the activated GUI element on the source system.

15. The data processing system of claim 12 wherein identifying an activated GUI element on the source system includes monitoring an operating system on the source system, detecting any GUI element activated by the operating system, and determining whether the activated GUI element meets user preferences.

16. The data processing system of claim 12 wherein forwarding the identified GUI element includes transforming the identified GUI element from a first format not suitable for processing by the remote system to a second format suitable for processing by the remote system for interaction with the user on the remote system.

17. A computer usable program product comprising a non-transitory computer usable storage medium including computer usable code for use in selectively forwarding activated graphical user interface (GUI) elements from a source system to a remote device for user interaction, the computer usable program product comprising code for performing the steps of:
configuring the source system for forwarding to the remote device a subset of activated GUI elements that are for front of screen display on the source system based on user preferences;
receiving the user preferences for determining which GUI elements to forward to the remote device;
in response to a user request, identifying an activated GUI element for front of screen display on the source system and related information that meets the user preferences; and
subsequent to the user request, forwarding only the identified GUI element and related information that meet the user preferences to the remote device for interaction with the user when the user is remote from the source system wherein interaction with the user includes receiving a user response through the forwarded GUI element at the remote device for processing by the source system;
wherein forwarding the identified GUI element includes transforming the identified GUI element from at least a first one from a set of window, dialog box and icon to a voice message.

18. The computer usable program product of claim 17 wherein the activated GUI element includes at least one from the set of a new GUI element and a newly activated previously active GUI element but does not include GUI elements displayed on the source system that were not activated subsequent to the user request other than the most front of screen current active window.

19. The computer usable program product of claim 17 further comprising awaiting a response from the user through the forwarded GUI element meeting the user preferences at the remote device, receiving the response from the user from the remote device, and utilizing the response as if it was from the activated GUI element on the source system.

20. The computer usable program product of claim 17 wherein identifying an activated GUI element on the source system includes monitoring an operating system on the source system, detecting any GUI element activated by the operating system, and determining whether the activated GUI element meets user preferences.

21. The computer usable program product of claim 17 wherein forwarding the identified GUI element includes transforming the identified GUI element from a first format not suitable for processing by the remote system to a second format suitable for processing by the remote system for interaction with the user on the remote system.

* * * * *